(12) United States Patent
Carnero Ros et al.

(10) Patent No.: US 9,219,690 B2
(45) Date of Patent: Dec. 22, 2015

(54) METHOD FOR INTRODUCING NETWORK CONGESTION PREDICTIONS IN POLICY DECISION

(75) Inventors: Roberto David Carnero Ros, Madrid (ES); Rebeca Beatriz Perez Lainez, Madrid (ES)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 119 days.

(21) Appl. No.: 14/000,967

(22) PCT Filed: Feb. 25, 2011

(86) PCT No.: PCT/IB2011/050823
§ 371 (c)(1),
(2), (4) Date: Aug. 22, 2013

(87) PCT Pub. No.: WO2012/131424
PCT Pub. Date: Oct. 4, 2012

(65) Prior Publication Data
US 2013/0329552 A1    Dec. 12, 2013

(51) Int. Cl.
*G06F 11/00* (2006.01)
*H04L 1/00* (2006.01)
(Continued)

(52) U.S. Cl.
CPC .............. *H04L 47/127* (2013.01); *H04L 47/14* (2013.01); *H04W 28/12* (2013.01)

(58) Field of Classification Search
CPC ...... H04L 47/127; H04L 47/14; H04W 28/12
USPC .............. 370/230, 230.1, 231, 232, 233, 234, 370/235, 235.1
See application file for complete search history.

(56) References Cited

U.S. PATENT DOCUMENTS 8,837,418 B2 *   9/2014  Smith et al. .................... 370/329
8,917,600 B2 * 12/2014  Avila Gonzalez et al. .... 370/235
(Continued)

FOREIGN PATENT DOCUMENTS

WO    2011006889 A1    1/2011
WO    2011020208 A1    2/2011

OTHER PUBLICATIONS

Provisional U.S. Appl. No. 61/424,603, filed Dec. 17, 2010.*
(Continued)

*Primary Examiner* — Chuong T Ho
(74) *Attorney, Agent, or Firm* — Rothwell, Figg, Ernst & Manbeck PC

(57) ABSTRACT

There is provided a Congestion Prediction Engine "CPE" of a Policy and Charging Control "PCX"' architecture. The PCC architecture also has a congestion database, a Policy and Charging Enforcement Function "PCEF" device and a Policy and Charging Roles Function "PCRF" node. The CPE includes a processing unit of the CPE which defines a currently applicable congestion prediction. The CPE includes a network; interface unit of the CPE which defines from the congestion database actual congestion data for a latest time period. The processing unit of the CPE determines a subsequent congestion prediction for a subsequent time period by comparing the currently applicable congestion prediction with the actual congestion data and by applying machine learning techniques. The CPE includes a memory of the CPE in which the currently applicable congestion prediction is replaced with the subsequent congestion prediction. The network interface unit of the CPE sends to a network entity the currently applicable congestion prediction so the PCRF can make a policy decision with quality of service "QoS" based on the currently applicable congestion prediction, upon establishment or modification of an IP Connectivity Access Network "IP-CAN" session for a user. A Policy and Charging Rules Function "PCRF" node of a Policy and Charging Control "PCC" architecture for making policy decisions based on network congestion. There is provided a method of a Congestion Prediction Engine "CPE" of a Policy and Charging Control "PCC" architecture and a method of making policy decisions at a Policy and Charging Control "PCC" architecture based on network congestion.

24 Claims, 4 Drawing Sheets

(51) Int. Cl.
*H04L 12/26* (2006.01)
*H04L 12/801* (2013.01)
*H04W 28/12* (2009.01)

(56) References Cited

U.S. PATENT DOCUMENTS

| | | | |
|---|---|---|---|
| 2005/0041584 A1 | 2/2005 | Lau et al. | |
| 2012/0140620 A1* | 6/2012 | Hogan et al. | 370/230 |
| 2012/0257499 A1* | 10/2012 | Chatterjee et al. | 370/232 |
| 2013/0183995 A1* | 7/2013 | Smith et al. | 455/452.2 |
| 2013/0272197 A1* | 10/2013 | Avila Gonzalez et al. | 370/328 |

OTHER PUBLICATIONS

"3rd Generation Partnership Project; Technical Specification Group Services and System Aspects; Policy and Charging Control Architecture (Release 11)," 3GPP TS 23.203 V11.0.1 (Jan. 2011), Mobile Competence Centre, Jan. 4, 2011, 137 pages, XP050462510.

"Predictive Congestion Management—Improving Subscriber Quality of Experience by Intelligently Addressing the Causes of RAN Congestion," Openet, Sep. 2, 2010, 9 pages, XP002658058.

China Mobile, China Unicorn, Huawei, Panasonic, ZTE, Allot Communication, Telcordia, NEC, AT&T, KDDI: "Policy Control Based on Network Condition," Third Generation Partnership Project, Oct. 14, 2010, 4 pages, XP002658059.

China Mobile, China Unicorn, Huawei, Panasonic, ZTE, Allot Communication, Telcordia, NEC, AT&T, KDDI, Bridgewater: "Policy Control Based on Network Condition," Third Generation Partnership Project, Oct. 15, 2010, 2 pages, XP002658060.

"3rd Generation Partnership Project: Technical Specification Group Core Network and Terminals; Policy and Charging Control over Gx reference point (Release 10)" 3GPP TS 29.212 V10.0.0 (Sep. 2010), 121 pages.

"3rd Generation Partnership Project; Technical Specification Group Services and System Aspects; Policy and Charging Control Architecture (Release 10)" 3GPP TS 23.203 V10.1.0 (Sep. 2010), 132 pages.

International Preliminary Report on Patentability and Written Opinion of the ISA issued on Aug. 27, 2013 in application No. PCT/IB2011/050823, 8 pages.

\* cited by examiner

METHOD FOR INTRODUCING NETWORK CONGESTION PREDICTIONS IN POLICY DECISION

CROSS REFERENCE TO RELATED APPLICATION(S)

This application is a 35 U.S.C. §371 National Phase Entry Application from PCT/IB2011/050823, filed Feb. 25, 2011, designating the United States, the disclosure of which is incorporated herein in its entirety by reference.

TECHNICAL FIELD

The present invention generally relates to Policy decisions based on network conditions. (As used herein, references to the "present invention" or "invention" relate to exemplary embodiments and not necessarily to every embodiment encompassed by the appended claims.) More particularly, the present invention relates to assignment of QoS based on prediction of network congestion.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The introduction of broadband access technologies—linked with attractive charging models and new services—and the success of the smart phones have implied more network usage by end-subscribers. Although solutions increasing the speed in the access network have been defined during the last years (e.g. HSPA, LTE), the network usage growth cannot be fully taken by such solutions. That is critical especially for the radio network, at least in the short-term. Due to that fact, telecommunications operators shall be ready to manage possible congestion situations in the access networks.

3GPP Rel-8 (and onwards) specifications propose an end-to-end congestion control mechanism based on admission control and resource reservation principles. Those principles imply that before establishing a new bearer for specific service flows, the network estimates if there is enough bandwidth in the network for setting the required Quality of Service "QoS". That implies the usage of Guaranteed-Bit-Rate (GBR) bearers (an IP Connectivity Access Network "IP-CAN" bearer with reserved bit-rate resources) for QoS demanding services together with priority handling. This is an end-to-end. (e2e) congestion handling mechanism, where the congestion handling is enforced in the radio side.

The e2e congestion control approach commented in previous paragraph requires a complete network upgrade. Due to the cost of such task, Operators are also considering other alternatives. One of such alternatives is the introduction of information about network load in the policy decision process. The basis for that is to add congestion status per location area available to Policy and Charging Control "PCC" architecture, thus given such information as input for the policy decision in a Policy and Charging control Rules Function "PCRF". The problem then is how (and where) the PCRF can get such network load information. Trying to solve such problem, some operators and vendors are proposing to use a direct connection from the PCRF towards a congestion database (it can be seen as an ad-hoc implementation of 3GPP Sp reference point for congestion status per location area information).

Nevertheless, this solution does not enable a real-time congestion control. The congestion analysis, which is based on the counters and statistics available in the network Operation and Maintenance (OAM) system (e.g. the OSS), requires some processing tune (15 minutes in most of the systems). So when the PCRF has the congestion status available, such information is not useful for taking an adequate policy decision (congestion conditions can change very fast).

The following problems have been identified for the existing solutions:

3GPP admission control and resource reservation procedure:
  It requires a complete e2e network update.
  It requires important system integration effort and cost.
  It requires terminals support.
  It is a high-cost solution, not addressing a market-need in a flat-credit situation.
Policy decisions based on network load:
  Not real time solution. The congestion status is available when maybe the congestion situation is over. Maybe the processing time for getting the congestion status information can be reduced, but impacting the characteristics and performance of the whole network.

SUMMARY

To overcome these problems, or at least to mitigate them, the present invention generally provides for making use of machine-learning techniques in order to perform congestion predictions per location area (e.g. cell, group of cells, routing area, etc).

The present invention pertains to a Congestion Prediction Engine "CPE" of a PCC architecture. The PCC architecture also has a congestion database, a Policy and Charging Enforcement Function "PCEF" device and a Policy and Charging Rules Function "PCRF" node. The CPE comprises a processing unit of the CPE which defines a currently applicable congestion prediction. The CPE comprises a network interface unit of the CPE which obtains from the congestion database actual congestion data for a latest time period. The processing unit of the CPE determines a subsequent congestion prediction for a subsequent time period by comparing the currently applicable congestion prediction with the actual congestion data and by applying machine learning techniques. The CPE comprises a memory of the CPE in which the currently applicable congestion prediction is replaced with the subsequent congestion prediction. The network interface unit of the CPE sends to a network entity the currently applicable congestion prediction so the PCRF can make a policy decision with quality of service "QoS" based on the currently applicable congestion prediction, upon establishment or modification of an IP Connectivity Access Network "IP-CAN" session for a user. In particular, this network entity may be a Subscription Profile Repository "SPR" of the PCC architecture, a User Database Repository "UDR", a congestion prediction database, the congestion database, or even the PCRF node of the PCC architecture if no other intermediate node is used.

The present invention pertains to a PCRF node of a PCC architecture for making policy decisions based on network congestion. The PCC architecture has a PCEF device. The PCRF node comprises a network interface unit of the PCRF node which receives from the PCEF device of the PCC architecture, upon establishment or modification of an IP-CAN session for a user, a request for a policy decision to be enforced for the IP-CAN session, and then obtains from a network entity a currently applicable congestion prediction. In particular, this network entity may be a Subscription Profile Repository "SPR" of the PCC architecture, a User Database Repository "UDR", a congestion prediction database, the congestion database, or even the Congestion Prediction Engine "CPE" of the PCC architecture. The PCRF node comprises a processing unit of the PCRF node which makes a policy decision with QoS based on the currently applicable congestion prediction, the network interface wait of the PCRF node submits to the PCEF device the policy decision to be enforced for the IP-CAN session.

The present invention pertains to a method of a CPE of a PCC architecture. The PCC architecture also has a congestion database, a PCEF device and a PCRF node. The method comprises the steps of defining with a processing unit of the CPE a currently applicable congestion prediction. There is the step of obtaining at a network interface unit of the CPE from the congestion database actual congestion data for a latest time period. There is the step of determining with the processing unit of the CPE a subsequent congestion prediction for a subsequent time period by comparing the currently applicable congestion prediction with the actual congestion data and by applying machine learning techniques. There is the step of replacing in a memory of the CPE the currently applicable congestion prediction with the subsequent congestion prediction. There is the step of sending from the network interface unit of the CPE to a network entity the currently applicable congestion prediction so the PCRF cart make a policy decision with QoS based on the currently applicable congestion prediction, upon establishment or modification of an IP-CAN session for a user. In particular, the network entity receiving the currently applicable congestion prediction may be a Subscription Profile Repository "SPR" of the PCC architecture, a User Database Repository "UDR", a congestion prediction database, the congestion database, or even the PCRF node of the PCC architecture directly receiving the currently applicable congestion prediction from the CPE if no other intermediate node is used.

The present invention pertains to a method of making policy decisions at a PCC architecture based on network congestion. The PCC architecture has a PCEF device and a PCRF node. The method comprises the steps of receiving at a network interface unit of the PCRF node from the PCEF device of the PCC architecture, upon establishment or modification of an IP-CAN session for a user, a request for a policy decision to be enforced for the IP-CAN session. There is the step of obtaining at the network interface unit of the PCRF node from a network entity a currently applicable congestion prediction. There is the step of making at a processing unit of the PCRF node a policy decision with QoS based on the currently applicable congestion prediction. There is the step of submitting from the PCRF node to the PCEF device the policy decision to be enforced tier the IP-CAN session. In particular, the network entity submitting the currently applicable congestion prediction to the PCRF node may be a Subscription Profile Repository "SPR" of the PCC architecture, a User Database Repository "UDR", a congestion prediction database, the congestion database, or even the Congestion Prediction Engine "CPE" of the PCC architecture.

The present invention provides for a new CPE, which obtains actual congestion data for a latest time period (e.g. day, week or month) from a congestion database, and makes a congestion prediction for a next time period; and an enhanced PCRF, which makes use of such congestion prediction at IP-CAN Session Establishment or Modification procedures for assigning an appropriate QoS based on said congestion prediction. In addition, the new Congestion Prediction Engine 'learns' for further predictions by comparing each prediction with the actual congestion data obtained from the congestion database.

The present invention thus provides for a method of assigning QoS for an IP-CAN session based on network congestion. The method comprising the steps of:
defining a currently applicable congestion prediction at a CPE of PCC architecture;
obtaining at the CPE from a congestion database actual congestion data for a latest time period;
determining at the CPE a subsequent congestion prediction for a subsequent time period by comparing the currently applicable congestion prediction with the actual congestion data and by applying machine learning techniques;
replacing at the CPE the currently applicable congestion prediction with the subsequent congestion prediction; and
providing the currently applicable congestion prediction towards a network entity;
upon an IP-CAN session establishment or IP-CAN session modification for a user, receiving at a PCRF from a PCEF of the PCC architecture a request for a policy decision to be enforced for the IP-CAN session;
obtaining the currently applicable congestion prediction at the PCRF and making a policy decision with QoS based on the currently applicable congestion prediction; and
submitting from the PCRF to the PCEF the policy decision to be enforced tier the IP-CAN session.

Advantageously in this method, both congestion prediction and actual congestion data are applied per location basis.

In particular, the time period for which each subsequent congestion prediction is determined is configurable at the CPE. Additional advantages are foreseeable where CPE provides the currently applicable congestion prediction towards the network entity along with an indication of the time period during which the congestion prediction is valid. Where the time period is indicated, the policy decision submitted from the PCRF to the PCEF may include a corresponding indication of the time period during which the policy decision is valid.

Advantageously, the network entity receiving the currently applicable congestion prediction from the CPE may be an SPR of the PCC architecture, a User Database Repository "UDR", a congestion prediction database, or the PCRF of the PCC architecture. Likewise, the network entity submitting the currently applicable congestion prediction to the PCRF may be an SPR of the PCC architecture, a User Database Repository "UDR", a congestion prediction database, or the CPE of the PCC architecture.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
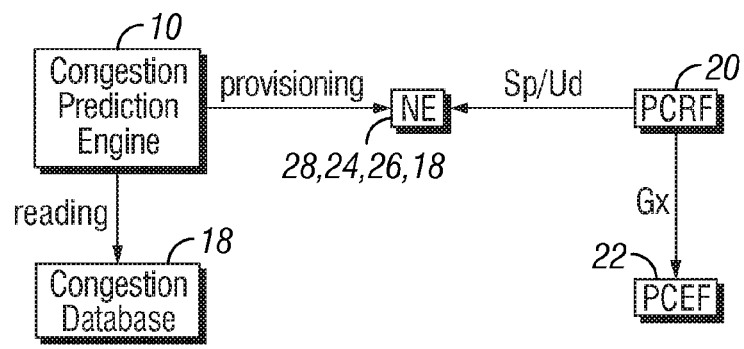
FIG. 1 shows building blocks of the present invention.
Figure 2:
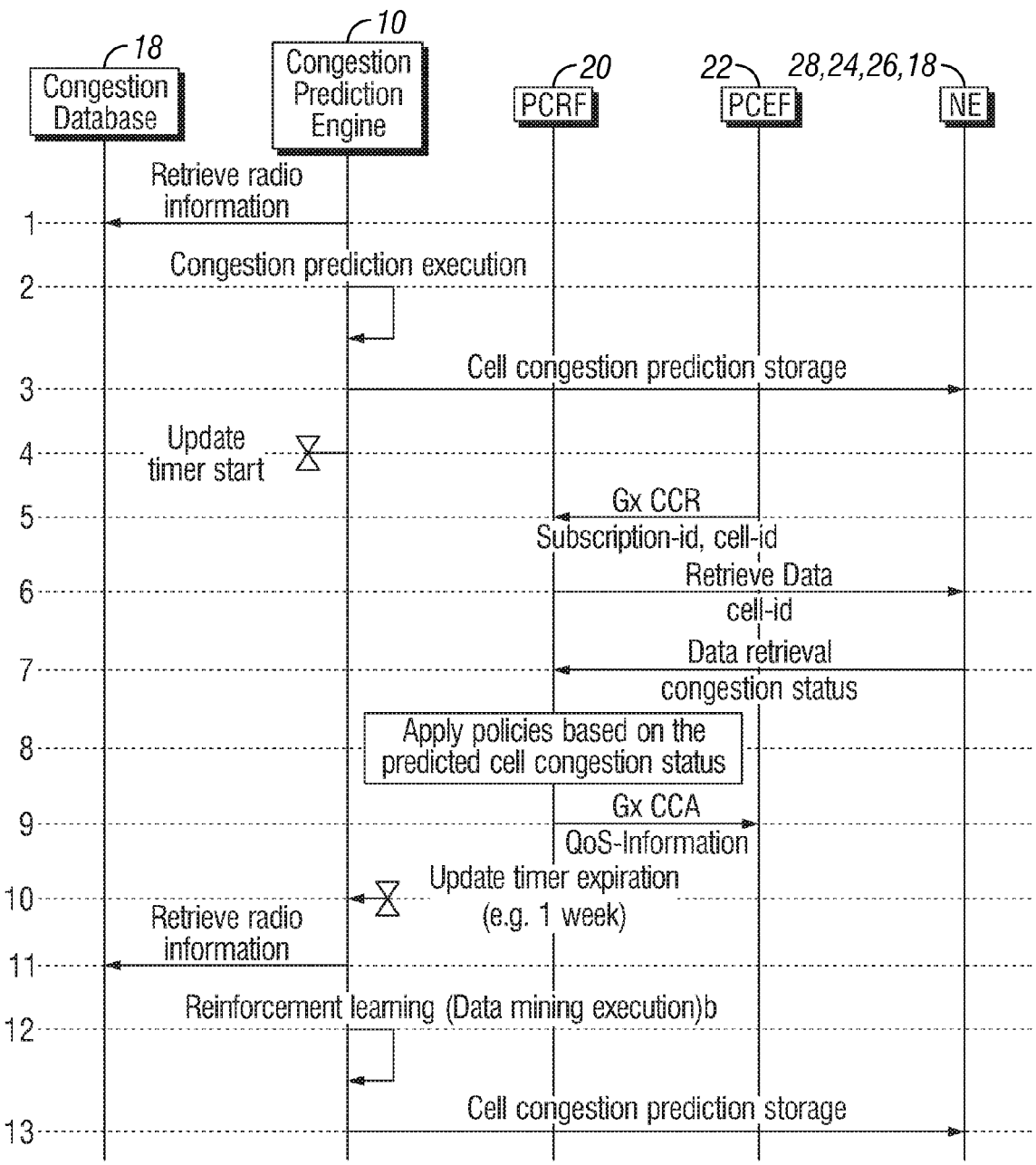
FIG. 2 shows a sequence diagram of the present invention.
Figure 4:
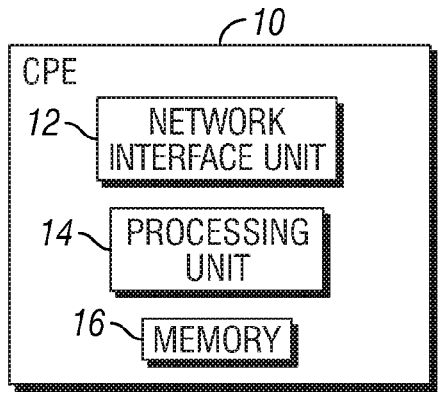
FIG. 4 is a block diagram of a congestion prediction engine of the present invention.

Referring no to the drawings wherein like reference numerals refer to similar or identical parts throughout the several views, and more specifically to FIG. 4 thereof, there is shown a CPE 10 of a PCC architecture. The PCC architecture also has a congestion database 18, a PCEF device 22 and a PCRF node 20, as illustrated in FIGS. 1 and 2. As shown in FIG. 4, the CPE 10 comprises a processing unit 14 of the CPE 10 which defines a currently applicable congestion prediction. The CPE 10 comprises a network interface unit 12 of the CPE 10 which obtains from the congestion database 18 actual congestion data for a latest time period. The processing unit 14 of the CPE 10 determines a subsequent congestion prediction for a subsequent time period by comparing the currently applicable congestion prediction with the actual congestion data and by applying machine learning techniques. The CPE 10 comprises a memory 16 of the CPE 10 in which the currently applicable congestion prediction is replaced with the subsequent congestion prediction. The network interface unit 12 of the CPE 10 sends to a network entity 28 the currently applicable congestion prediction so the PCRF can make a policy decision with QoS based on the currently applicable congestion prediction, upon establishment or modification of an IP-CAN session for a user.

The network entity 28 may be an entity selected from: a Subscription Profile Repository "SPR" 24 of the PCC architecture, a User Database Repository "UDR" 26, a congestion prediction database, the congestion database 18, and the PCRF node 20 of the PCC architecture. The network interface unit 12 of the CPE 10 may obtain from the congestion database 18 actual congestion data for a latest time period, and the processing unit 14 of the CPE 10 applies machine learning techniques to the actual congestion data in order to determine the currently applicable congestion prediction.

The processing unit 14 of the CPE 10 may compare how different the congestion of the currently applicable congestion prediction and the congestion of the actual congestion data were for the time period, and makes a new congestion prediction for a next time period by applying machine learning techniques to results from the comparing step, and the network interface unit 12 of the CPE 10 provides the new congestion prediction to the network entity 28 so the PCRF node 20 can make a policy decision with QoS based on the new prediction for the next time period. The network interface unit 12 of the CPE 10 may send to the network entity 28 an indication of a time period during which the congestion prediction is valid. The network interface unit 12 of the CPE 10 may obtain average throughput per location area, average number of users per location area, a timestamp associated with the actual congestion data and a location identifier.

Figure 5:
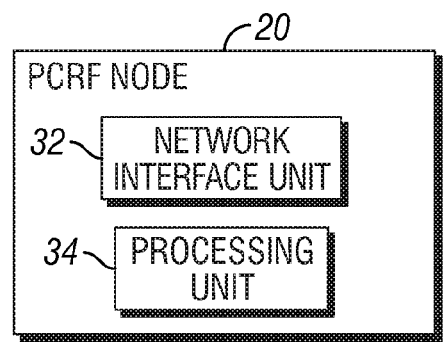
FIG. 5 is a block diagram of a PCRF node of the present invention.

The present invention pertains to a PCRF node of a PCC architecture for making policy decisions based on network congestion, as shown in FIG. 5. The PCC architecture has a PCEF device 22. The PCRF node 20 comprises a network interface unit 32 of the PCRF node 20 which receives from the PCEF device 22 of the PCC architecture, upon establishment or modification of an IP-CAN session for a user, a request for a policy decision to be enforced for the IP-CAN session, and then obtains from a network entity 28 a currently applicable congestion prediction. The PCRF node 20 comprises a processing unit 34 of the PCRF node 20 which makes a policy decision with QoS based on the currently applicable congestion prediction, the network interface unit 32 of the PCRF node 20 submits to the PCEF device 22 the policy decision to be enforced for the IP-CAN session.

The network entity 28 may be an entity selected from: an SPR 24 of the PCC architecture, a UDR 26, a congestion prediction database, the congestion database 18, and the CPE 10 node of the PCC architecture. The network interface unit 32 of the PCRF node 20 may obtain from the network entity 28 an indication of a time period during which the congestion prediction is valid. Where this is the case, the network interface unit 32 of the PCRF node 20 may submit to the PCEF device 22 an indication of the time period during which the policy decision is valid.

The present invention pertains to a method of a CPE 10 of a PCC architecture. The PCC architecture also has a congestion database 18, a PCEF device 22 and a PCRF node 20. The method comprises the steps of defining with a processing unit 14 of the CPE 10 a currently applicable congestion prediction. There is the step of obtaining at a network interface unit 12 of the CPE 10 from the congestion database 18 actual congestion data for a latest time period. There is the step of determining with the processing unit 14 of the CPE 10 a subsequent congestion prediction for a subsequent time period by comparing the currently applicable congestion prediction with the actual congestion data and by applying machine learning techniques. There is the step of replacing in a memory 16 of the CPE 10 the currently applicable congestion prediction with the subsequent congestion prediction. There is the step of sending from the network interface unit 12 of the CPE 10 to a network entity 28 the currently applicable congestion prediction so the PCRF can make a policy decision with QoS based on the currently applicable congestion prediction, upon establishment or modification of an IP-CAN session for a user.

The network entity 28 may be an entity selected from: an SPR 24 of the PCC architecture, a UDR 26, a congestion prediction database, the congestion database 18, and the PCRF node 20 of the PCC architecture. The step of defining a currently applicable congestion prediction may include a step of obtaining at a network interface unit 12 of the CPE 10 from the congestion database 18 actual congestion data for a latest time period, and a step of applying machine learning techniques to the actual congestion data in order to determine the currently applicable congestion prediction.

The step of determining a subsequent congestion prediction for a subsequent time period may include a step of comparing, with the processing unit 14 of the CPE 10 how different the congestion of the currently applicable congestion prediction and the congestion of the actual congestion data were for the time period, a step of making with the processing unit 14 of the CPE 10 a new congestion prediction for a next time period by applying machine learning techniques to results from the comparing step, and a step of providing from the network interface unit 12 of the CPE 10 the new congestion prediction to the network entity 28 so the PCRF node 20 can make a policy decision with QoS based on the new prediction for the next time period.

The step of sending to a network entity 28 the currently applicable congestion prediction may include a step of sending to the network entity 28 an indication of a time period during which the congestion prediction is valid. The step of obtaining actual congestion data from the congestion database 18 may include the step of obtaining average throughput per location area, average number of users per location area, a timestamp associated with the actual congestion data and a location identifier.

There may be the step of removing by the processing twit 14 of the CPE 10 input attributes from congestion data in the congestion database 18 that are not relevant for the currently applicable congestion prediction. There may be the step of transforming by the processing unit 14 of the CPE 10 the actual congestion data received from the congestion database 18 into a format required by the machine learning techniques.

Figure 6:
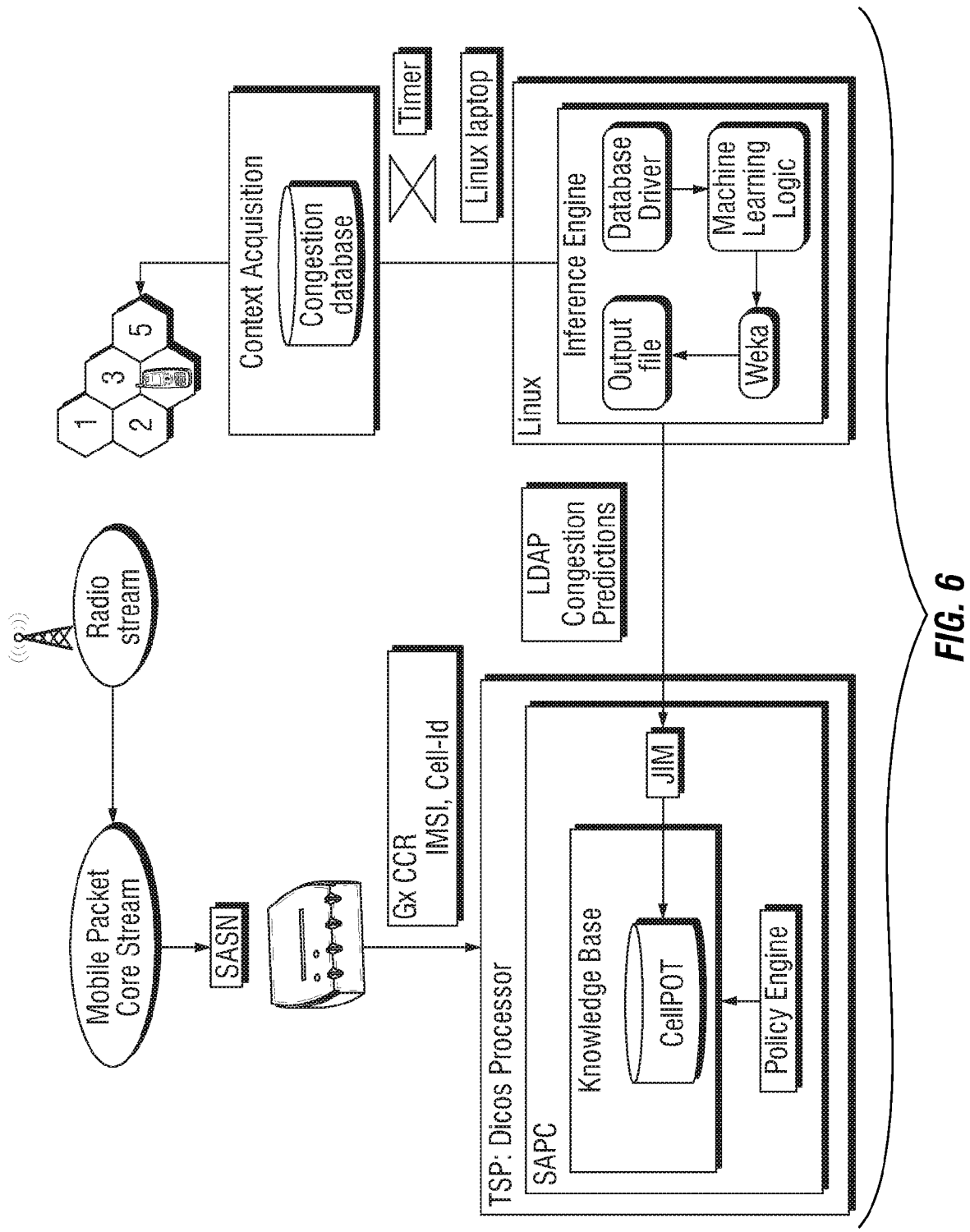
FIG. 6 shows a PCC architecture regarding the present invention.

The present invention pertains to a method of making policy decisions at a PCC architecture based on network congestion. See FIGS. 1, 2 and 6. The PCC architecture has a PCEF device 22 and a PCRF node 20. The method comprises the steps of receiving at a network interface unit 32 of the PCRF node 20 from the PCEF device 22 of the PCC architecture, upon establishment or modification of an IP-CAN session for a user, a request for a policy decision to be enforced for the IP-CAN session. There is the step of obtaining at the network interface unit 32 of the PCRF node 20 from a network entity 28 a currently applicable congestion prediction. There is the step of making at a processing unit 34 of the PCRF node 20 a policy decision with QoS based on the currently applicable congestion prediction. There is the step of submitting from the PCRF node 20 to the PCEF device 22 the policy decision to be enforced for the IP-CAN session.

The network entity 28 may be an entity selected from: an SPR 24 of the PCC architecture, a UDR 26, a congestion prediction database, the congestion database 18, and the CPE 10 node of the PCC architecture. The step of obtaining from a network entity 28 a currently applicable congestion prediction may include a step of obtaining from the network entity 28 an indication of a time period during which the congestion prediction is valid. The step of submitting to the PCEF device 22 the policy decision may include a step of submitting, from the PCRF node 20 to the PCEF device 22 an indication of the time period during which the policy decision is valid.

In the operation of the present invention, machine-learning techniques are used for performing congestion predictions per location area (e.g. cell, group of cells, routing area, etc.). For such purpose, a new CPE 10 entity is proposed. Said entity takes the congestion information for the last time period (e.g. day, week or month) from a congestion database 18, and makes a congestion prediction for the next time period. The CPE 10 device then provisions such predictions in the SPR 24 or UDR 26. The PCRF can then make use of such prediction at IP-CAN Session Establishment or Modification procedures. Therefore the QoS assigned can take into account a predicted congested status.

When the period of time for which the prediction was made is over, the CPE 10 will retrieve the actual congestion data for such period from the Congestion database 18. Then it will compare how different the congestion prediction and the congestion actual data were. Based on the results of such comparison, the CPE 10 will make a new prediction for the next period, making the learning process. And it stores those new predictions in the SPR 24 or UDR 26. Therefore the PCRF can make use of such new values for the next period of time. Alternatively, the new predictions may be directly submitted to the PCRF node 20, or to any other network entity 28, for storage therein.

The aim of such learning process is to reduce the gap between the congestion prediction and the real data in subsequent cycles. In that way, after several training cycles, the learning mechanism enables to make the prediction quite close to the actual value. In such way, the PCRF is aware in advance of the congestion status for the specific required location.

The present invention utilizes a new entity to be added to PCC architecture, called CPE 10. Such entity shall be capable of making congestion predictions for the location areas of the access network (e.g. cells, group of cells or routing areas). For such purpose, such entity makes use of one specific subset of data mining methods: machine-learning techniques. Data mining is defined as the process of discovering patterns in large data set in a semi-automated way in order to obtain meaningful patterns and rules. Machine Learning, which belongs to Artificial Intelligence, consists of making use of statistics theory for building mathematical models capable of making inferences from a sample.

FIG. 1 describes the architectural model of the invention. The CPE 10 takes actual congestion information regarding the last time period (e.g. day, week or month, in steps of 15 minutes) from a congestion database 18. The congestion database 18 contains historical congestion data per location area (e.g. cell, group of cells or routing area). Such information may be deducted from network OAM systems like the OSS. In fact, a radio location is considered congested when a certain combination of the average number of subscribers per area and the average throughput in such area happens.

Based on such input data, the CPE 10 shall be capable of making congestion prediction for the next equal period of rime (e.g. day, week or month). For such purpose, the CPE 10 makes use of machine learning techniques. The supervised learning methods, which are a subset of machine learning techniques, are the most adequate. Supervised learning methods are used for classification purposes, and consist of the analysis of the behavior and attributes of determined input parameters in order to predict the new behavior.

Figure 3:
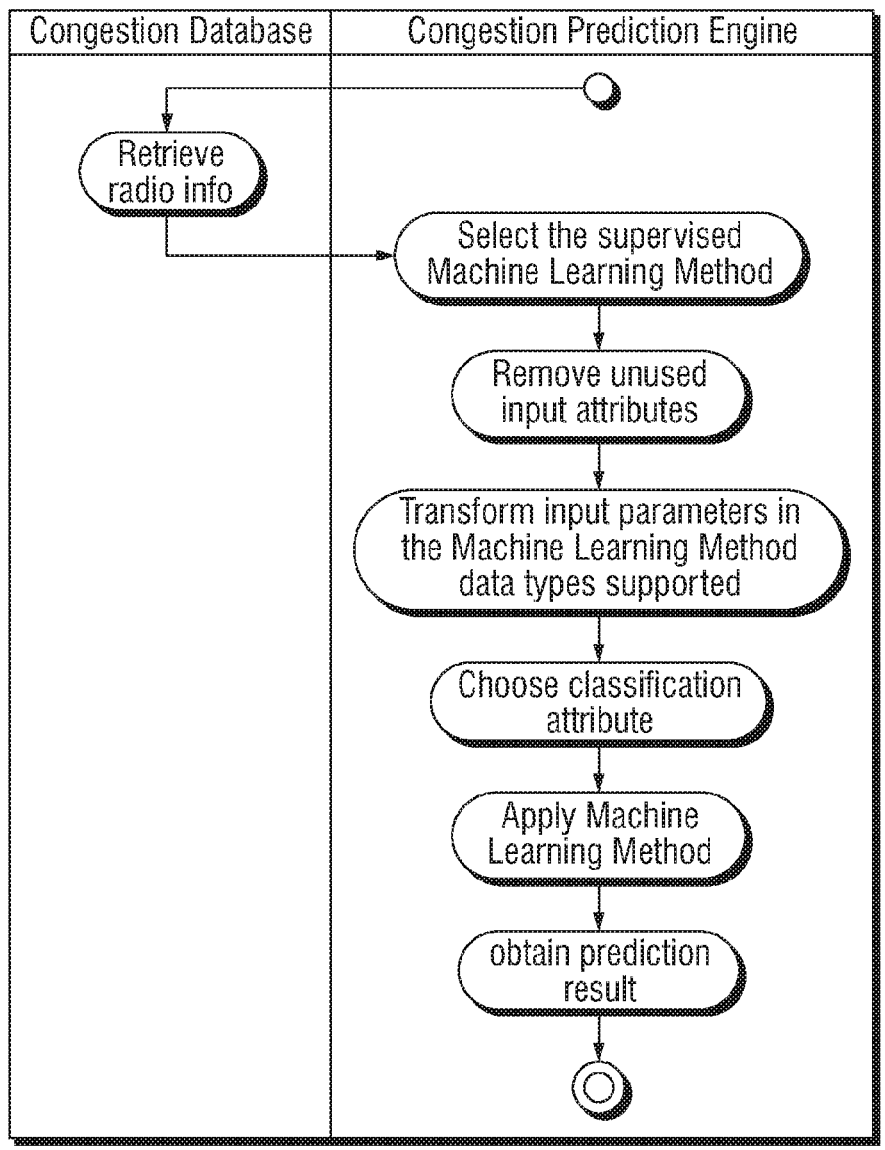
FIG. 3 shows the machine learning process of the present invention.

As an example, FIG. 3 describes how the congestion prediction may be performed. First of all, the CPE 10 retrieves the congestion relevant information from the congestion database 18. Among such information are the following: average throughput per location area (avgtp), average number of users (avgusr) per location area, timestamp when the measurement was taken, and location identifier.

Then the CPE 10 selects to apply the supervised machine learning, methods. Commonly, machine learning devices contain a software kit (for instance, WEKA freeware) including an important amount of techniques. The aim of such is to enable an easy engine adaptation in case the chosen technique starts to have lack of accuracy. Weka is a freeware that provides collection of machine learning algorithms for data mining tasks. The algorithms can either be applied directly to a dataset or called from your own Java code. Weka contains tools for data pre-processing, classification, regression, clustering, association rules, and visualization. It is also well-suited for developing new machine learning schemes.

Weka is open source software issued under the GNU General Public License. It is developed by a New Zealand University (Waikato) (see www.cs.waikato.ac.nz/ml/weka/).

Following this, the CPE 10 removes the input attributes (retrieved from the radio OAM or congestion database 18) that could be not relevant for the location congestion prediction (for instance, the MSISDN of the subscribers in the location). Besides, and based on the combination of the avgtp and the avgusr, a congestion status per cell is assigned. The following is just an example of how such congestion status per cell assignment can be done:

```
IF avgusr >= 3 and avgtp <= 800 THEN congestion status == 2
/*(congested) */
ELSE IF avgusr > 2 and avgtp < 1200 kbps THEN congestion
status == 1 /*(trending to congestion) */
ELSE congestion == 0 /*(no congestion)*/
```

The CPE 10 shall also transform the format of the input data in the one that the machine learning technique requires. For instance, if a decision tree ID3 technique is used, and due to the fact this specific technique just manages numeric information, the input data shall be transformed into numeric data.

Therefore now the CPE 10 can choose the classification criterion. The congestion status is used as classification attribute. Based on such classification criterion, and using both the location identifier and the timestamp when the measurement was taken as attributes, the CPE 10 is capable of building, for instance, a J48 decision tree, whose output contains the congestion predictions per location area and timestamp. J48 and ID3 are two different kind of machine learning decision trees algorithms. J48 makes use of strings as for building the decision tree, and ID3 requires numerical data.

When such predictions are available, the CPE 10 device can provision them in the SPR 24 (or UDR 26), or any other suitable network entity accessible to the PCRF node, even the PCRF node itself. Then if the PCRF receives the location area at IP-CAN Session Establishment or Modification procedures (information included either in Gx 3GPP-User-Location-Info or RAI AVP, see reference [2], the PCRF can retrieve the congestion prediction for such location area from the SPR 24 (or UDR 26), and apply a specific policy. Due to that, the predicted congestion status can be used as input for the policy decision. Such policy decision can be, for instance, a bearer QoS or a bandwidth throttling decision on a per service level. And the PCC can finally enforce a policy based on congestion prediction per location area.

The key of the machine-learning techniques is the training process. This process enables the system to learn from what was wrongly predicted, and improve the future predictions. For such purpose, and when the period of time for which the previous prediction was made is over, the CPE 10 retrieves the actual congestion data for such period from the Congestion database 18. Then it compares how different the congestion prediction and the congestion actual data were. Based on the results of such comparison, the CPE 10 makes a new prediction for the next period. And it stores those new predictions in the SPR 24 or UDR 26, or other network entity, such as the PCRF node itself. Therefore the PCRF can make use of such new values for deciding the applicable policies during the next period of time.

It's important to highlight that for the first prediction, the CPE 10 does not execute any training process. The real congestion data for the last period of time retrieved then is the unique input used for making the prediction—due to the CPE 10 does not have any other prediction previously executed, so no comparison is possible. The subsequent predictions will be capable of making the training process properly—due to there is a previous prediction that can be used for the comparison.

Such cycle of retrieving data, making new predictions based on the learning procedure, and storing the new predictions in the SPR 24, is repeated each time the validity of the prediction expires, and for an unlimited number of cycles. According to machine-learning principles, after a certain number of repetitions of the cycle, the predictions shall trend to be quite close to the actual values, making the system more accurate.

FIG. 2 describes an example of sequence diagram for the invention according to PCC architecture. Steps 1 to 4 depict how the first prediction is executed.

1. The CPE 10 retrieves the congestion information of the last period of time (e.g. week, day) per location area. (e.g. cell, routing area) from a congestion database 18. The time interval containing congestion information could be configurable (one hour, 24 hours, etc.).

2. The CPE 10 makes the congestion prediction per cell for the next 24 hours making use of a machine learning techniques.
3. The congestion predictions are stored in the SPR 24 or UDR 26.
4. The CPE 10 starts an update timer.

Steps 5 to 9 detail how such congestion information is used for the IP-CAN Session Establishment procedure according to reference [1] clause 7.2. Alternative flows for IP-CAN Session Modification as they are described in reference [1] clause 7.3 may be considered instead.

5. PCEF sends a Gx CCR, including the IMSI and the location (either RAI AVP or 3GPP-User-Location-Info AVP) to the PCRF.
6. The PCRF request congestion information to the SPR 24 for the received location.
7. The SPR 24 provides the congestion status for the requested location.
8. PCEF makes policy decision based on the congestion predicted status for such location. Moreover, PCRF provides a validity time for such policy decision.
9. PCRF sends a Gx CCA including the policies to be applied by PCEF. Steps 10 to 13 describe the training process.
10. The update timer expires.
11. The CPE 10 retrieves the real congestion information from the last retrieval (e.g. 1 week).
12. The CPE 10 compares the previous congestion prediction and the real data. The CPE 10 makes use of the results of such comparison for predicting the new congestion status for the next period of time.
13. The new congestion predictions are stored in the SPR 24 or UDR 26, and the update timer is restarted.

The sequence diagram highlights that the data retrieval, prediction and system training are done off-line, not impacting then PCRF performance. It's also important to highlight that this kind of deployment does not have any impact in existing legacy systems or terminals.

Policy and Charging Control (PCC) architecture permits to integrate both policy and charging control. This architecture can be applied to the traffic done by a UE to access to content offered by a content provider.

Figure 7:
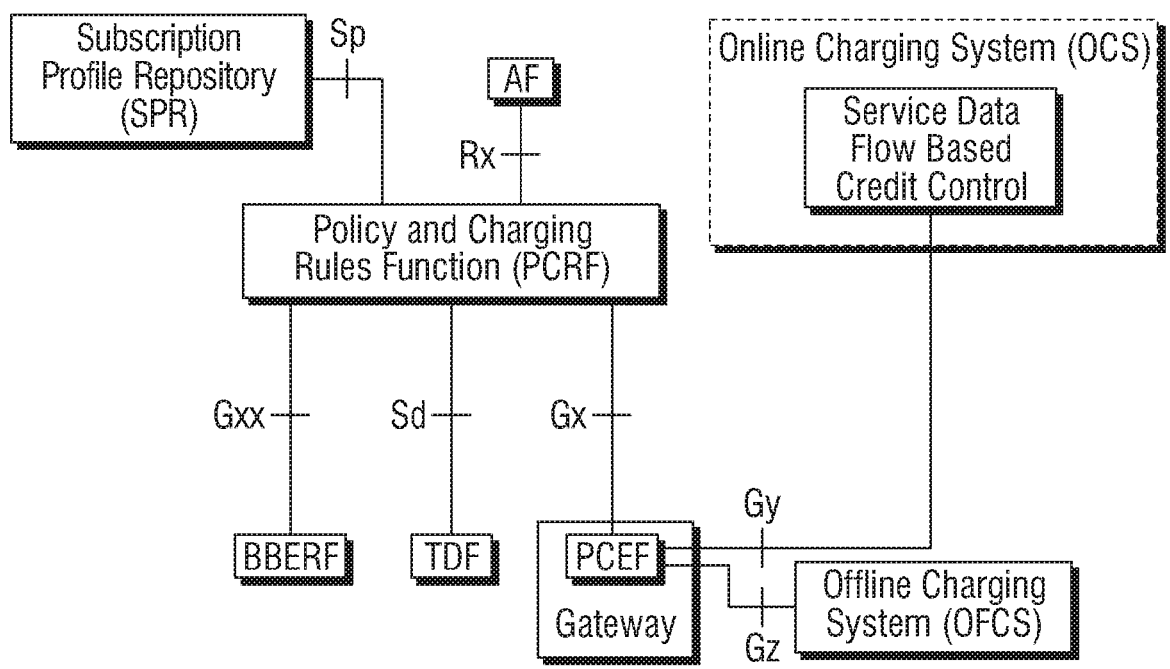
FIG. 7 shows a PCC policy and charging control architecture (SPR used and non roaming case).

A simplified architecture for supporting Policy and Charging Control functionalities is depicted in FIG. 7. This FIG. 7 shows some functional entities (nodes) and has been taken from TS 23.203 (V 10.2.0), which is a 3GPP document specifying, the PCC functionality for Evolved 3GPP Packet Switched domain, including both 3GPP accesses (GERAN/UTRAN/E-UTRAN) and Non-3GPP accesses.

A short description in relationship with the architecture shown in FIG. 7 is now provided.

The PCRF (Policy Control and Charging Rules Function) is a functional element that encompasses policy control decision and flow based charging control functionalities. The PCRF provides network control regarding the service data flow detection, gating, QoS and flow based charging (except credit management) towards the PCEF. The PCRF receives session and media related information from the AF and informs AF of traffic plane events. The PCRF provisions PCC Rules to the PCEF via the Gx reference point.

The PCEF (Policy and Charging Enforcement Function) is the functional element that encompasses policy enforcement and flow based charging functionalities. This functional entity is preferably located at the Gateway (e.g. GGSN in the GPRS case, and PDG in the WLAN case). It provides control over the user plane traffic handling at the Gateway and its QoS, and provides service data flow detection and counting as well as online and offline charging interactions.

The Application Function (AF) is an element offering applications in which service is delivered in a different layer (i.e. transport layer) from the one the service has been requested (i.e. signaling layer), the control of IP bearer resources according to what has been negotiated. One example of an AF is the P-CSCF of the IM CN subsystem. The AF shall communicate with the PCRF to transfer dynamic session information (i.e. description of the media to be delivered in the transport layer). This communication is performed using the Rx interface.

The TDF (Traffic Detection Function) can detect a service with a service traffic detection mechanism. When the services detected matches with specific service detection rules provided by the PCRF, TDF informs the PCRF about the detected service. The PCRF can then react in the desired way with regard to the policy and charging control information for the detected traffic. The TDF terminology used in the standard corresponds to the DPI used in this document.

The main advantages of the invention are listed below:

Predictions trend to be accurate after certain training repeats, so PCRF is capable of applying policy based on network conditions.

Data retrieval, prediction and system training can be executed off-line, not impacting then PCRF performance.

No impacts in existing legacy systems or terminals.

ABBREVIATIONS

3GPP Third Generation Partnership Project
e2e End-to-end
GBR Guaranteed Bit Rate
HSPA High Speed Packet Access
IP-CAN IP Connectivity Access Network
LTE Long Term Evolution
OAM Operation and Maintenance
OSS Operations Support System
PCC Policy and Charging Control
PCEF Policy and Charging Enforcement Function
PCRF Policy and Charging Rules Function
QoS Quality of Service
SPR Subscription Profile Repository
UDR User Data Repository

REFERENCES

1. Policy and Charging Control architecture. 3GPP TS 21203 v10.0.2
2. Policy and Charging Control over Gx reference point. 3GPP IS 29.212 v.10.0.0

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method of a Congestion Prediction Engine (CPE) of a Policy and Charging Control (PCC) architecture, the PCC architecture also has a congestion database, a Policy and Charging Enforcement Function (PCEF) device and a Policy and Charging Rules Function (PCRF) node, the method comprising the steps of:

defining with a processing unit of the CPE a currently applicable congestion prediction;

obtaining at a network interface unit of the CPE from the congestion database actual congestion data for a latest time period;

determining with the processing unit of the CPE a subsequent congestion prediction for a subsequent time period by comparing the currently applicable congestion prediction with the actual congestion data and by applying machine learning techniques;

storing in a memory of the CPE the subsequent congestion prediction as a new currently applicable congestion prediction; and sending from the network interface unit of the CPE to a network entity the new currently applicable congestion prediction so the PCRF can make a policy decision with quality of service (QoS) based on the new currently applicable congestion prediction, upon establishment or modification of an IP Connectivity Access Network (IP-CAN) session for a user.

2. The method of claim 1, wherein the network entity is an entity selected from: a Subscription Profile Repository (SPR) of the PCC architecture, a User Database Repository (UDR), a congestion prediction database, the congestion database, and the PCRF node of the PCC architecture.

3. The method of claim 1, wherein the step of defining a currently applicable congestion prediction includes a step of obtaining at a network interface unit of the CPE from the congestion database actual congestion data for a latest time period, and a step of applying machine learning techniques to the actual congestion data in order to determine the currently applicable congestion prediction.

4. The method of claim 1, wherein the step of determining a subsequent congestion prediction for a subsequent time period includes a step of comparing with the processing unit of the CPE how different the congestion of the currently applicable congestion prediction and the congestion of the actual congestion data were for the time period, and a step of making with the processing unit of the CPE a new congestion prediction for a next time period by applying machine learning techniques to results from the comparing step.

5. The method of claim 1, wherein the step of sending to a network entity the new currently applicable congestion prediction includes a step of sending to the network entity an indication of a time period during which the congestion prediction is valid.

6. The method of claim 1 wherein the step of obtaining actual congestion data from the congestion database includes the step of obtaining average throughput per location area, average number of users per location area, a timestamp associated with the actual congestion data and a location identifier.

7. The method of claim 1, wherein the subsequent time period is a period of fifteen minutes.

8. The method of claim 1, wherein the sending from the network interface unit of the CPE to the network entity the new currently applicable congestion prediction enables real-time congestion control.

9. The method of claim 1, wherein applying machine-learning techniques includes training a model offline, thereby not impacting PCRF performance.

10. The method of claim 1, wherein applying machine-learning techniques includes applying supervised learning methods.

11. A method of making policy decisions at a Policy and Charging Control (PCC) architecture based on network congestion, the PCC architecture having a Policy and Charging Enforcement Function (PCEF) device and a Policy and Charging Rules Function (PCRF) node, the method comprising the steps of:
- receiving at a network interface unit of the PCRF node from the PCEF device of the PCC architecture, upon establishment or modification of an IP Connectivity Access Network (IP-CAN) session for a user, a request for a policy decision to be enforced for the IP-CAN session;
- obtaining at the network interface unit of the PCRF node from a network entity a currently applicable congestion prediction;
- making at a processing unit of the PCRF node a policy decision with quality of service (QoS) based on the currently applicable congestion prediction; and
- submitting from the PCRF node to the PCEF device the policy decision to be enforced for the IP-CAN session.

12. The method of claim 11, wherein the network entity is an entity selected from: a Subscription Profile Repository (SPR) of the PCC architecture, a User Database Repository (UDR), a congestion prediction database, the congestion database, and a Congestion Prediction Engine (CPE) of the PCC architecture.

13. The method of claim 11, wherein the step of obtaining from a network entity a currently applicable congestion prediction includes a step of obtaining from the network entity an indication of a time period during which the congestion prediction is valid.

14. The method of claim 13, wherein the step of submitting to the PCEF device the policy decision includes a step of submitting from the PCRF node to the PCEF device an indication of the time period during which the policy decision is valid.

15. A Congestion Prediction Engine (CPE) of a Policy and Charging Control (PCC) architecture, the PCC architecture also has a congestion database, a Policy and Charging Enforcement Function (PCEF) device and a Policy and Charging Rules Function (PCRF) node, the CPE comprising:
- a processing unit of the CPE which defines a currently applicable congestion prediction;
- a network interface unit of the CPE which obtains from the congestion database actual congestion data for a latest time period, the processing unit of the CPE determining a subsequent congestion prediction for a subsequent time period by comparing the currently applicable congestion prediction with the actual congestion data and by applying machine learning techniques;
- a memory of the CPE in which the subsequent congestion prediction is stored as a new currently applicable congestion prediction; and
- the network interface unit of the CPE sending to a network entity the new currently applicable congestion prediction so the PCRF can make a policy decision with quality of service (QoS) based on the new currently applicable congestion prediction, upon establishment or modification of an IP Connectivity Access Network (IP-CAN) session for a user.

16. The CPE of claim 15, wherein the network entity is an entity selected from: a Subscription Profile Repository (SPR) of the PCC architecture, a User Database Repository (UDR), a congestion prediction database, the congestion database, and the PCRF node of the PCC architecture.

17. The CPE of claim 15, wherein the network interface unit of the CPE obtains from the congestion database actual congestion data for a latest time period, and the processing unit of the CPE applies machine learning techniques to the actual congestion data in order to determine the currently applicable congestion prediction.

18. The CPE of claim 15, wherein the processing unit of the CPE compares how different the congestion of the currently applicable congestion prediction and the congestion of the actual congestion data were for the time period, and makes a new congestion prediction for a next time period by applying machine learning techniques to results from the comparison.

19. The CPE of claim 15, wherein the network entity sends to the network entity an indication of a time period during which the congestion prediction is valid.

20. The CPE of claim 15 wherein the network interface unit of the CPE obtains average throughput per location area, average number of users per location area, a timestamp associated with the actual congestion data and a location identifier.

21. A Policy and Charging Rules Function (PCRF) node of a Policy and Charging Control (PCC) architecture for making policy decisions based on network congestion, the PCC architecture having a Policy and Charging Enforcement Function (PCEF) device, the PCRF node comprises:
- a network interface unit of the PCRF node which receives from the PCEF device of the PCC architecture, upon establishment or modification of an IP Connectivity Access Network (IP-CAN) session for a user, a request for a policy decision to be enforced for the IP-CAN session, and then obtains from a network entity a currently applicable congestion prediction; and
- a processing unit of the PCRF node which makes a policy decision with quality of service (QoS) based on the currently applicable congestion prediction, the network interface unit of the PCRF node submits to the PCEF device the policy decision to be enforced for the IP-CAN session.

22. The PCRF node of claim 21, wherein the network entity is an entity selected from: a Subscription Profile Repository (SPR) of the PCC architecture, a User Database Repository (UDR), a congestion prediction database, the congestion database, and a Congestion Prediction Engine (CPE) of the PCC architecture.

23. The PCRF node of claim 21, wherein the network interface unit of the PCRF node obtains from the network entity an indication of a time period during which the congestion prediction is valid.

24. The PCRF node of claim 23, wherein the network interface unit of the PCRF node submits to the PCEF device an indication of the time period during which the policy decision is valid.

* * * * *

UNITED STATES PATENT AND TRADEMARK OFFICE
CERTIFICATE OF CORRECTION

PATENT NO.       : 9,219,690 B2
APPLICATION NO.  : 14/000967
DATED            : December 22, 2015
INVENTOR(S)      : Carnero Ros et al.

Page 1 of 2

It is certified that error appears in the above-identified patent and that said Letters Patent is hereby corrected as shown below:

On the Title Page, Item (75), under "Inventors", in Column 1, Line 2, delete "Perez" and insert -- Pérez --, therefor.

On the Title Page, Item (57), under "ABSTRACT", in Column 2, Line 2, delete ""PCX""" and insert -- "PCC" --, therefor.

On Page 2, Item (56), under "OTHER PUBLICATIONS", in Column 2, Line 1, delete "Unicorn;" and insert -- Unicom, --, therefor.

On Page 2, item (56), under "OTHER PUBLICATIONS", in Column 2, Line 5, delete "Unicorn," and insert -- Unicom, --, therefor.

In the specification

In Column 1, Line 53, delete "end-to-end." and insert -- end-to-end --, therefor.

In Column 2, Line 8, delete "tune" and insert -- time --, therefor.

In Column 3, Line 11, delete "wait" and insert -- unit --, therefor.

In Column 3, Line 30, delete "cart" and insert -- can --, therefor.

In Column 3, Line 55, delete "tier" and insert -- for --, therefor.

In Column 4, Line 29, delete "tier" and insert -- for --, therefor.

In Column 5, Line 3, delete "no" and insert -- now --, therefor.

In Column 6, Lines 43-44, delete "comparing," and insert -- comparing --, therefor.

Signed and Sealed this
Second Day of August, 2016

Michelle K. Lee
*Director of the United States Patent and Trademark Office*

CERTIFICATE OF CORRECTION (continued)
U.S. Pat. No. 9,219,690 B2

In the specification

In Column 6, Line 64, delete "twit" and insert -- unit --, therefor.

In Column 7, Line 28, delete "submitting," and insert -- submitting --, therefor.

In Column 8, Line 20, delete "rime" and insert -- time --, therefor.

In Column 8, Line 36, delete "learning," and insert -- learning --, therefor.

In Column 9, Line 19, delete "(information" and insert -- information --, therefor.

In Column 9, Line 26, delete "PCC" and insert -- PCEF --, therefor.

In Column 9, Line 64, delete "area." and insert -- area --, therefor.

In Column 10, Line 8, delete "according," and insert -- according --, therefor.

In Column 10, Lines 45-46, delete "specifying," and insert -- specifying --, therefor.

In Column 11, Line 51, delete "IS" and insert -- TS --, therefor.